US012186611B2

(12) United States Patent
Certain et al.

(10) Patent No.: US 12,186,611 B2
(45) Date of Patent: Jan. 7, 2025

(54) FIRE SPRINKLER SYSTEM FOR BUILDING MANAGEMENT

(71) Applicant: Siemens Industry, Inc., Alpharetta, GA (US)

(72) Inventors: Corey Certain, Lincolnton, NC (US); Kunal Chitre, Austin, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 480 days.

(21) Appl. No.: 17/679,706

(22) Filed: Feb. 24, 2022

(65) Prior Publication Data

US 2023/0149758 A1 May 18, 2023

Related U.S. Application Data

(60) Provisional application No. 63/279,604, filed on Nov. 15, 2021.

(51) Int. Cl.
*A62C 37/50* (2006.01)
*A62C 37/40* (2006.01)
*G05B 19/406* (2006.01)

(52) U.S. Cl.
CPC .............. *A62C 37/50* (2013.01); *A62C 37/40* (2013.01); *G05B 19/406* (2013.01)

(58) Field of Classification Search
CPC ......... A62C 37/50; A62C 37/40; A62C 35/68; G05B 19/406
See application file for complete search history.

(56) References Cited

U.S. PATENT DOCUMENTS

| 11,080,988 B2* | 8/2021 | Lim ...................... G08B 17/117 |
| 2017/0348557 A1 | 12/2017 | Pohl et al. |
| 2018/0169451 A1* | 6/2018 | Moffa ..................... A62C 37/50 |
| 2018/0214726 A1* | 8/2018 | Nelson .................... A62C 35/68 |
| 2019/0247691 A1* | 8/2019 | Trivelpiece ............. A62C 37/10 |
| 2021/0079630 A1* | 3/2021 | Poojary ..................... G01F 1/66 |
| 2021/0197004 A1 | 7/2021 | Hofmann et al. |
| 2021/0293354 A1 | 9/2021 | Sprakel et al. |

(Continued)

FOREIGN PATENT DOCUMENTS

| CN | 204952041 U | 1/2016 |
| CN | 211659138 U | 10/2020 |
| CN | 214033877 U | 8/2021 |

OTHER PUBLICATIONS

Siemens Industry, Inc., Building Technologies Division flyer for Fire and Life Safety Services, 2020, 2 pages.

(Continued)

*Primary Examiner* — Chad G Erdman (57) ABSTRACT

A fire sprinkler system, and a method thereof, for building management comprises life safety equipment, sensors positioned proximal to the life safety equipment, and a remote analytics unit communicating directly or indirectly with the sensors via a multi-location network. The life safety equipment include a fluid pump, a fluid pipe section, and a fluid coupling section. The sensors detect a fluid characteristic within a particular equipment of the life safety equipment. The remote analytics unit receives data based on the fluid characteristics detected at the sensors and determines a fault condition associated with one or more equipment based on the fluid characteristic.

21 Claims, 9 Drawing Sheets

(56) References Cited

U.S. PATENT DOCUMENTS

| | | | |
|---|---|---|---|
| 2022/0228915 A1* | 7/2022 | Timler | A62C 37/04 |
| 2022/0291066 A1* | 9/2022 | Krywyj | G01M 3/243 |

OTHER PUBLICATIONS

The Siemens Site Controls Enterprise Portal, Siemens Industry, Inc. Building Technologies Division, Retail and Commercial Systems, 2015, 8 pages.

* cited by examiner

FIRE SPRINKLER SYSTEM FOR BUILDING MANAGEMENT

FIELD OF THE INVENTION

This application relates to the field of building management for fire sprinkler systems and, more particularly, to a fire sprinkler system having a control panel for monitoring one or more conditions and/or operations of life safety equipment.

BACKGROUND

Building management systems encompass a wide variety of systems that aid in the monitoring and control of various aspects of building operation. Building management systems include fire safety, heating, ventilation, and air conditioning ("HVAC"), and/or security units that may be controlled by a common control station. The common control station is often co-located at the same building as the units and associated devices to be monitored.

Building owners and operators typically do not have visibility to the health of their fire sprinkler systems. In particular, fire sprinkler systems implemented in existing buildings have water contained in pipes that may be susceptible to freezing, especially for areas of the building that are not heated, which may be unoccupied or in generally warmer environments. Also, existing fire sprinkler systems may not know or recognize pressure drops within their piping networks, such as at a valve or other coupling for distribution of water to various rooms or areas within the system. Operational changes to the fire sprinkler system, such as temperature and pressure, may have significant negative consequences for the building owners and operators.

Technicians, including local fire inspectors, may perform regular on-site manual inspections and physical troubleshooting of an existing fire sprinkler system of a building in an attempt to avoid these negative consequences. Even so, such regular inspections may be unnecessary if the fire sprinkler system is in good condition, costing time and money for the building owner. In addition, such inspections may not prevent a fire sprinkler system from failing due to an unforeseen environmental condition where certain sections of the fire sprinkler system may be susceptible to freezing, causing a degradation in the pipe, or a pipe bursting.

SUMMARY

In accordance with one embodiment of the disclosure, there is provided a fire sprinkler system providing a smart services approach to building management. The fire sprinkler system includes specific sensors at pipes, valves and other components of the system to monitor pressure, temperature, corrosion, vibration, and other life safety conditions. The sensors are coupled to a control panel of a facility where the system is employed to detect characteristic changes to the fluids within the system components. For example, temperature sensors at pipe locations within the network may indicate freezing conditions of the contained fluids and pressures sensors at valve or other fluid coupling locations may indicate low pressure conditions of the distributed fluids.

Information detected by the sensors may be provided to an analytics application where analytics are applied to determine faults indications of system health. The fire sprinkler system identifies conditions within the existing fire sprinkler system that may impact the health of the system and pro-actively corrects such conditions automatically. For example, the fire sprinkler system may include one or more remote devices, such as in the cloud, for monitoring and controlling the health of the fire sprinkler system, thus improving life safety and preventing failure of the system. The remote monitoring capability for the fire sprinkler system protects a facility from expensive damages due to undetected failures or other conditions of importance of the system.

One aspect is a fire sprinkler system for building management comprising multiple life safety equipment, multiple sensors positioned proximal to the life safety equipment, and a remote analytics unit communicating directly or indirectly with the sensors via a multi-location network. The life safety equipment include a fluid pump, a fluid pipe section, and a fluid coupling section. The sensors detect a fluid characteristic within a particular equipment of the life safety equipment. The remote analytics unit receives data based on the fluid characteristics detected at the sensors and determines a fault condition associated with one or more equipment based on the fluid characteristic.

Another aspect is a method of a fire sprinkler system for building management. Life safety equipment are established in which the equipment include a fluid pump, a fluid pipe section, and a fluid coupling section. Sensors are positioned proximal to the life safety equipment in which each sensor detects a fluid characteristic within a particular equipment of the life safety equipment. The sensors communicate directly or indirectly with a remote analytics unit via a multi-location network. The remote analytics unit receives data based on the fluid characteristic detected at the sensors and determines a fault condition associated with one or more equipment based on the fluid characteristic.

Yet another aspect is a system for monitoring an existing fire sprinkler system installed in a building, the fire sprinkler system including a fluid pump and a fluid pipe network coupled to the fluid pump, the fluid pipe network having pipe components, the pipe components including pipe sections and at least one fluid coupling section. The system comprises temperature sensors and a remote analytics unit communicating directly or indirectly with the sensors via a multi-location network. Each temperature sensor is positioned proximal to a respective one of the pipe components of the fluid pipe network such that each sensor detects a temperature characteristic within the respective pipe component. The remote analytics receives data based on the temperature characteristics detected at the sensors and determines a fault condition associated with at least one pipe component of the existing fire sprinkler system based on the temperature characteristic.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate building management, particularly smart services, for a fire sprinkler system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The fire sprinkler system provides smart services for building management of one or more facilities. The system includes sensors provided at life safety equipment of a fire sprinkler unit to monitor pressure, temperature, corrosion, vibration, and other life safety properties. The sensors may be co-located with pipes, valves and other life safety equipment and coupled via wired or wireless link to a building automation controller, such as a control panel, at a facility where the fire sprinkler unit is employed. Sensor outputs may be provided to a remote analytics unit where data associated with the sensor-collected information is analyzed and various components of the fire sprinkler unit may be managed based on the data.

Figure 1:
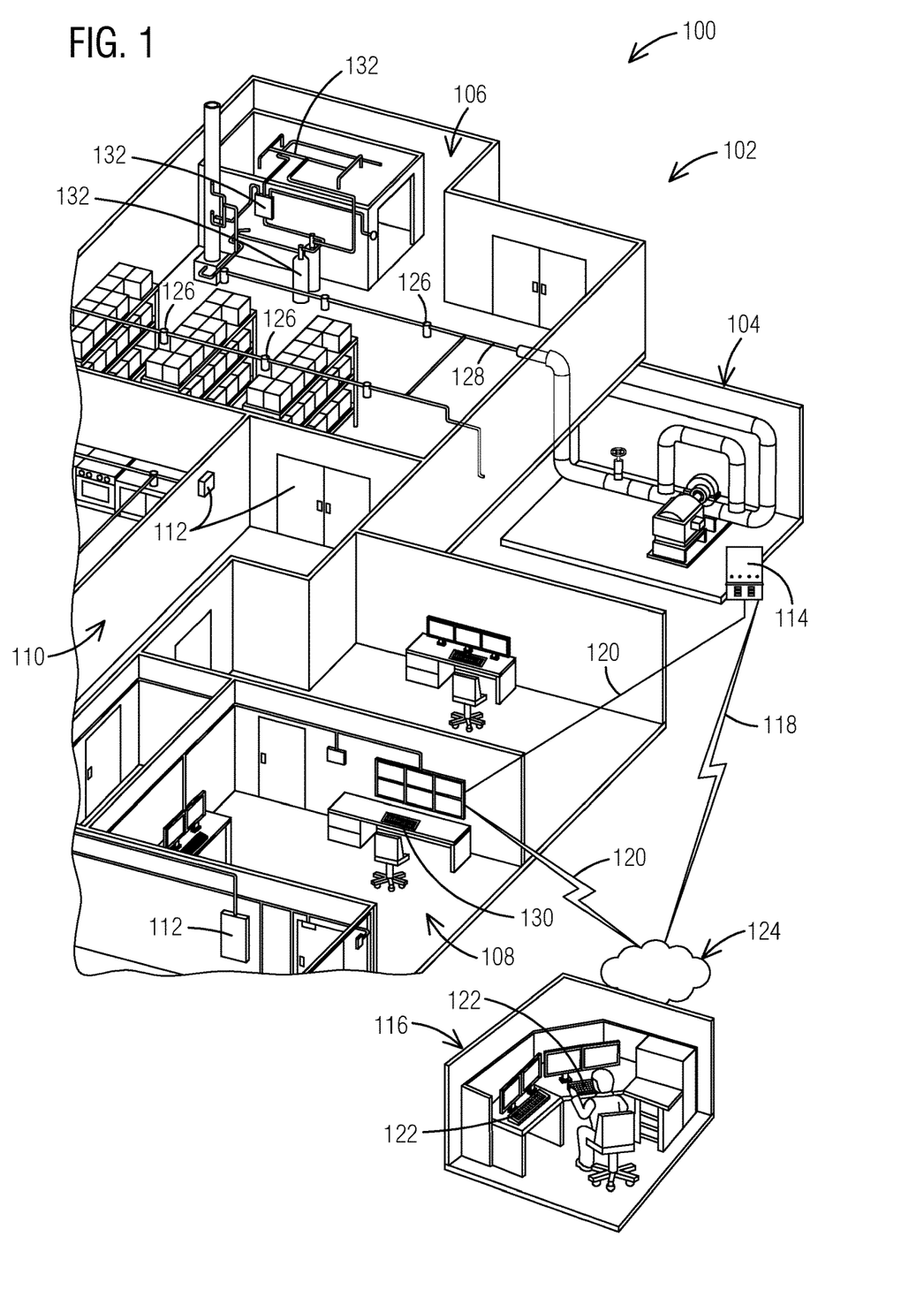
FIG. 1 is an illustration of an environment in an example implementation that is operable to employ techniques described herein.

Referring to FIG. 1, there is shown an illustration of an environment in an example implementation that is operable to employ techniques described herein. In particular, the environment includes a fire sprinkler system 100 installed and configured at a facility 102, such as a site of a building and/or one or more areas associated with the building. The fire sprinkler system 100 comprises life safety equipment positioned, installed, and/or configured for a facility 102 that includes a fire pump room 104, one or more life safety-equipped rooms 106, and a network management room 108. The facility 102 may include other rooms, passages, and areas 110 that may benefit from the features of the fire sprinkler system 100. For some embodiments, the fire sprinkler system 100 may operate independently or in conjunction with other building management equipment 112 associated with the facility. For example, the fire sprinkler system 100 may include emergency communications, such as a mass notification system, or utilize emergency communications of a building management system of the facility 102.

The fire pump room 104 may include a control panel 114 (explained in more detail below in reference to FIGS. 2, 5, and 6) coupled to the sensors proximally positioned with life safety equipment to provide data based on the fluid characteristics detected by the sensors to a remote analytics site 116. The control panel 114 may communicate with the remote analytics site 116 by a direct wired or wireless link 118 or by an indirect wired or wireless link 120 via the network management room 108. More particularly, the remote analytics site 116 includes one or more remote analytics units 122 communicating with the control panel 114 via the direct or indirect links 118, 120. The remote analytics unit 122 communicates directly or indirectly via a multi-location network 124 with sensors coupled to the control panel 114 and located at the fire pump room 104. For some embodiments, the remote analytics site 116 and remote analytics unit(s) 122 may be considered to be part of a Cloud network accessible by the control panel 114.

The life safety-equipped room or rooms 106 may include fluid-based fire sprinklers 126 positioned at various locations and connected to each other by a fluid conduit 128. Life safety fluid, such as water, may be provided to the fire sprinklers 126 by the life safety equipment of the fire pump room 104, as monitored and/or controlled by the control panel 114. For some embodiments, the life safety-equipped room(s) 106 may include non-fluid equipment 132, such as dry chemical industrial suppression equipment, that operate independently or in coordination with the fire sprinkler system 100.

The network management room 108 includes one or more network management stations 130 configured to manage the building management system of the facility 102. As stated above, the control panel 114 may communicate the remote analytics site 116 by an indirect wired or wireless link 120 via the network management room 108. For such embodiments, the control panel 114 communicates with a network management station 130 of the network management room 108, and the network management station communicates with the remote analytics unit or units 122 of the remote analytics site 116.

Figure 2:
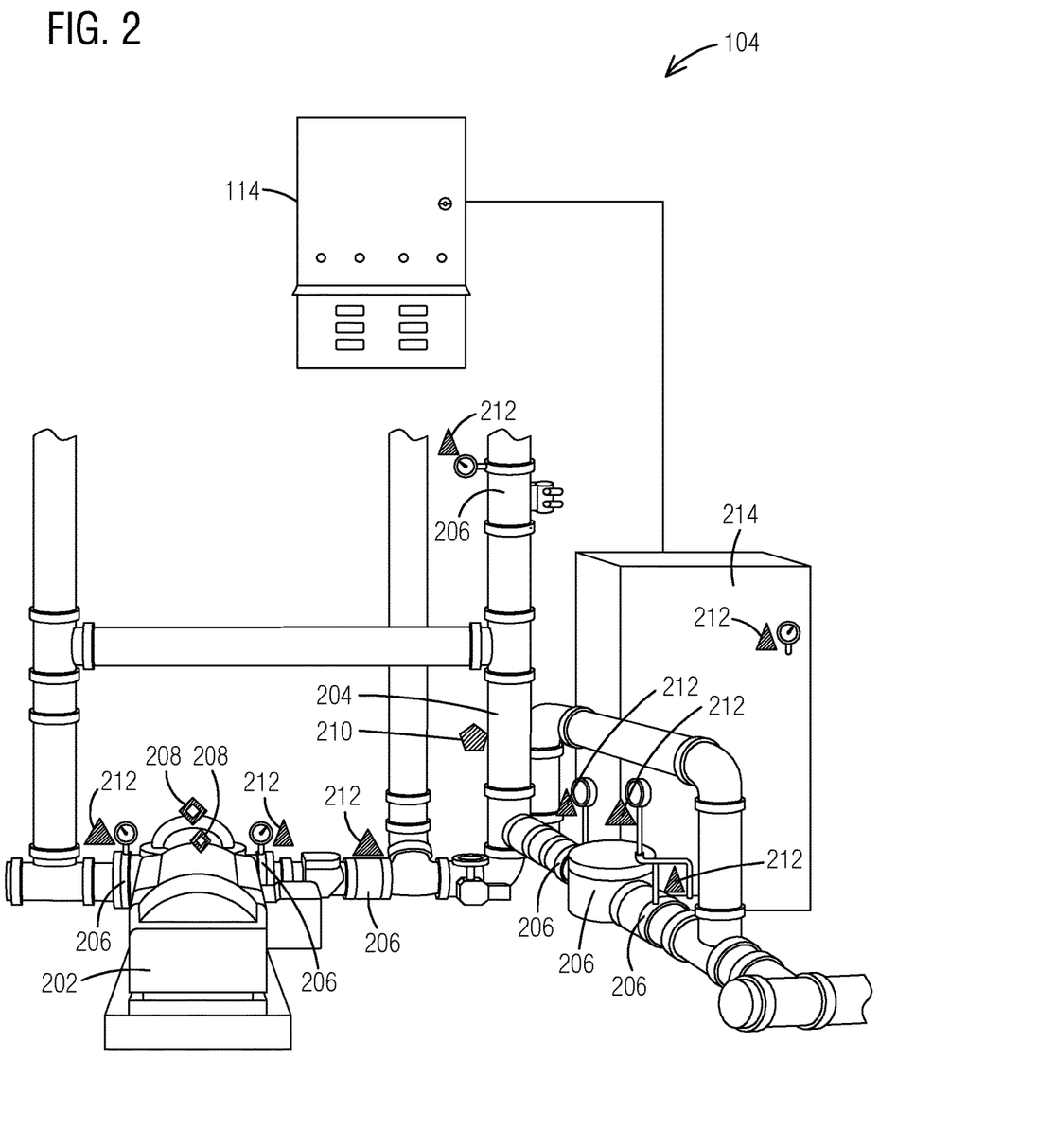
FIG. 2 depicts an example implementation of the fire pump room of FIG. 1, which includes the control panel.

Referring to FIG. 2 in conjunction with FIG. 1, there is shown an example implementation of the fire pump room 104, which includes the control panel 114 of the fire sprinkler system 100. The fire sprinkler system 100 for building management comprises life safety equipment including a fluid pump 202, a fluid pipe section 204, and a fluid coupling section 206. The fire sprinkler system 100 also includes sensors 208, 210, 212 positioned proximal to the life safety equipment in which each sensor detects a fluid characteristic within a particular equipment of the life safety equipment.

Examples of sensors include, but are not limited to, vibration sensors 208, pipe temperature sensors 210, and pressure transducers 212. The fire sprinkler system 100 may include one or more vibration sensors 208, one or more pipe temperature sensors 210, one or more pressure transducers 212, or a combination of these sensors. For some embodiments, the fluid pump 202 may include one or more vibration sensors 208 to detect abnormal behavior of the motor or pump of the fluid pump. The vibration sensor 208 may be positioned adjacent the fluid pipe section 204 in which the vibration sensor detects a motion characteristic associated with a fatigue failure condition of the fluid pipe section. It should be noted that a vibration sensor 208 may also be positioned at a fluid pipe section 204 or fluid coupling section 206 to detect and monitor vibration conditions that may cause cracks or leaks at the section, i.e., fatigue failure. Vibrations may be monitored based on movement amplitude, velocity, and other vibration property.

For some embodiments, a temperature sensor 210 may be positioned adjacent to an external surface the fluid pipe section 204 in which the temperature sensor detects an ambient temperature or temperature of the pipe in proximity to the fluid pipe section. For some embodiments, the temperature sensor 210 supplements an air temperature sensor distal from the external surface of the fluid pipe section 204, such as an ambient room temperature sensor. For some embodiments, a pressure transducer or sensor 212 may be coupled to the coupling section 206 in which the pressure sensor detects a fluid pressure within the fluid coupling section 206. For some embodiments, a corrosion sensor may be positioned adjacent to an external surface of the fluid pipe section 204 in which the corrosion sensor detects an energy differential associated with a corrosion condition within the fluid pipe section 204. For some embodiments, the corrosion sensor emits and detects ultrasonic waves to detect a thickness of the fluid pipe section 204.

A fire pump room 104 of fire sprinkler system 100 may include a fire pump controller 214 to manage and operate the life safety equipment, such as the fluid pump 202, the fluid pipe section 204, and the fluid coupling section 206. For such embodiments, the control panel 114 of the fire sprinkler system 100 may be coupled to the fire pump controller 214, the sensors 208, 210, 212 associated with the life safety equipment, or both.

Figure 3A:
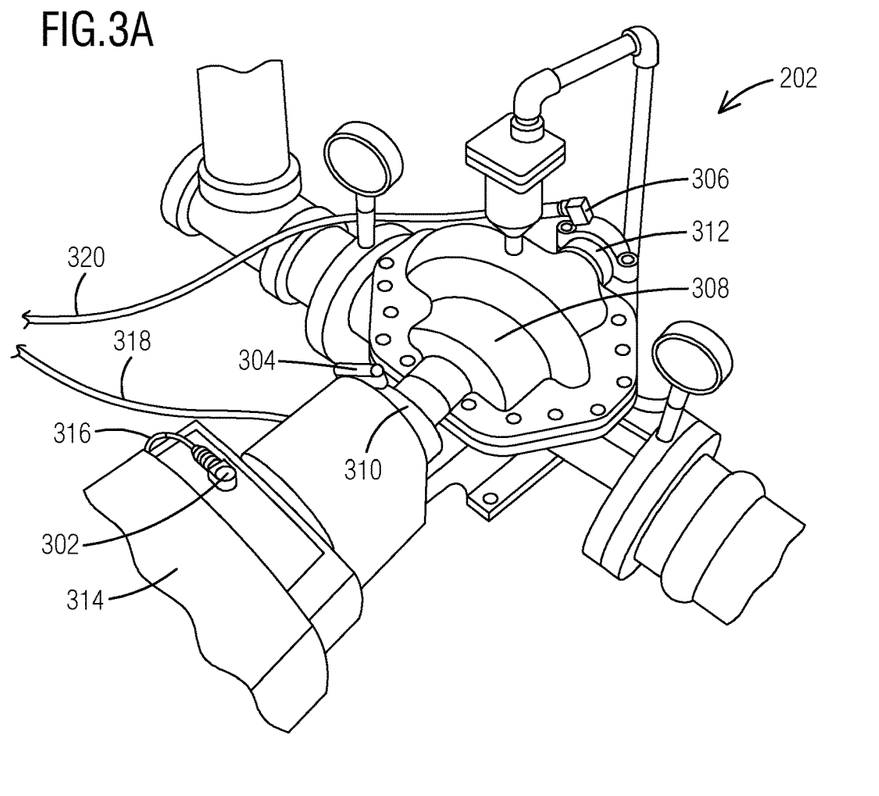
FIGS. 3A and 3B depict example implementations of select life safety equipment of FIG. 2.

Referring to FIGS. 3A, 3B, 4A, and 4B, there are shown example implementations of select life safety equipment. FIG. 3A illustrates how one or more vibration sensors 302, 304, 306 may be positioned on a fluid pump 202. The fluid pump 202 may include a pump 308 having opposing bearings 310, 312 and an electric motor 314 driving the pump at one of the bearings. A motor vibration sensor 302 may be positioned at the electric motor 304, a first pump vibration sensor 304 may be positioned at one pump bearing 310, a second pump vibration sensor 306 may be positioned at another pump bearing 312, or a combination of two or three of these sensors may be positioned at the fluid pump 202. Each sensor 302, 304, 306 has a signal link 316, 318, 320 coupling the sensor to the control panel 114 and/or the fire pump controller 214. Each sensor or combination of sensors 302, 304, 306 detect vibration, in millimeters per second or the like, at its particular position in order for the fire sprinkler system 100 to identify abnormal behavior of the fluid pump 202. For example, if one sensor (e.g., the second pump vibration sensor 306) detects a vibration level of 5 mm/second at one bearing (e.g., the pump bearing 312) and the other sensor (e.g., the first pump vibration sensor 304) detects a vibration level of 20 mm/second at the other bearing (e.g., the pump bearing 310), then one or both bearings may be failing or there may be a misalignment with the electric motor 314.

Figure 3B:
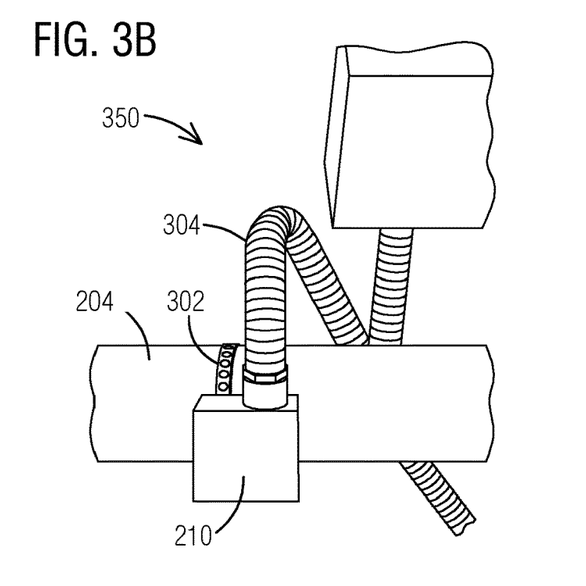

FIG. 3B is a pipe temperature sensor 210 to monitor temperature proximal to the fluid pipe section 204. For the embodiment shown in FIG. 3B, the temperature sensor 210 may be positioned adjacent to an external surface the fluid pipe section 204 in which the temperature sensor detects an ambient temperature or temperature of the pipe in proximity to the fluid pipe section. For example, the temperature sensor 210 may be mounted to the external surface by a circumferential band 302. In addition, the temperature sensor 210 is coupled to the control panel 114 and/or the fire pump controller 214 for communications via temperature sensor link 304 which, for some embodiments, may also include a power source connection to the sensor. Each temperature sensor 210 detects temperature at its particular position in order for the fire sprinkler system 100 to identify abnormal temperatures of the fluid pipe section 204. For example, a detected temperature below 40 degrees Fahrenheit, or other temperature close to freezing or below, may indicate a potential fluid freeze and/or busting of the fluid pipe section 204.

Figure 4A:
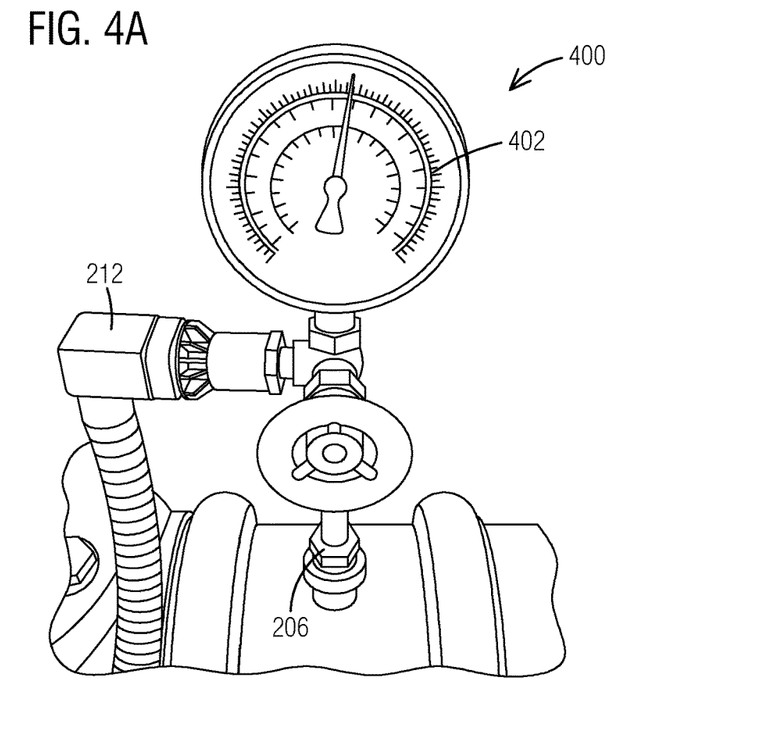
FIGS. 4A and 4B depict example implementations of other select life safety equipment of FIG. 2.

FIG. 4A is a closeup of a pressure regulating valve 400. A three-way valve is typically used to couple to an installed pressure gauge since system operators attach a calibrated gauge to the three-way valve to compare with the installed pressure gauge to check its accuracy. For the fire sprinkler system 100, the pressure transducer 212 and the installed pressure gauge 402 are coupled to the fluid coupling section 206, and the pressure sensor detects a fluid pressure within the fluid coupling section. Calibration by a system operator may be accomplished by viewing the fluid pressure detected by the pressure transducer 212 at a remote device, such as a mobile communication device communicating with the control panel 114, the network management station 130, and/or the remote analytics unit 122, and comparing it to the measurement shown by the installed pressure gauge 402, i.e., self calibration.

Figure 4B:
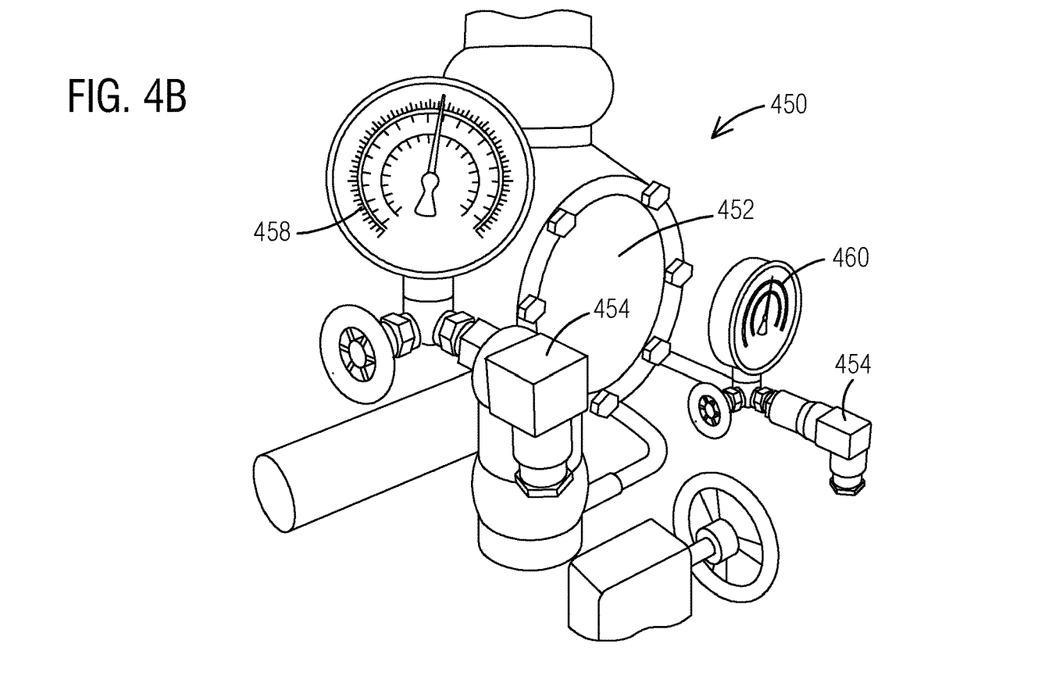

FIG. 4B represents pressure transducers for a dry system 450 having a dry alarm valve 452, such as one that may be used for a parking garage. For this example, an air pressure transducer 454 is shown at the left and a fluid pressure transducer or sensor 456 is shown at the right. The fluid pressure sensor 456 detects a fluid pressure within the fluid coupling section, i.e., the dry alarm valve 452. If the air pressure transducer 454 detects an air pressure drop below a predetermined level, such as 10 PSI, then a notification signal may be generated to indicate a dangerously low level, in which the valve may trip, water may freeze, and/or the fluid coupling section may bust. For some embodiments, the dry system may include gauges 458, 460 corresponding to the air and fluid pressures of the dry alarm valve 452.

Figure 5:
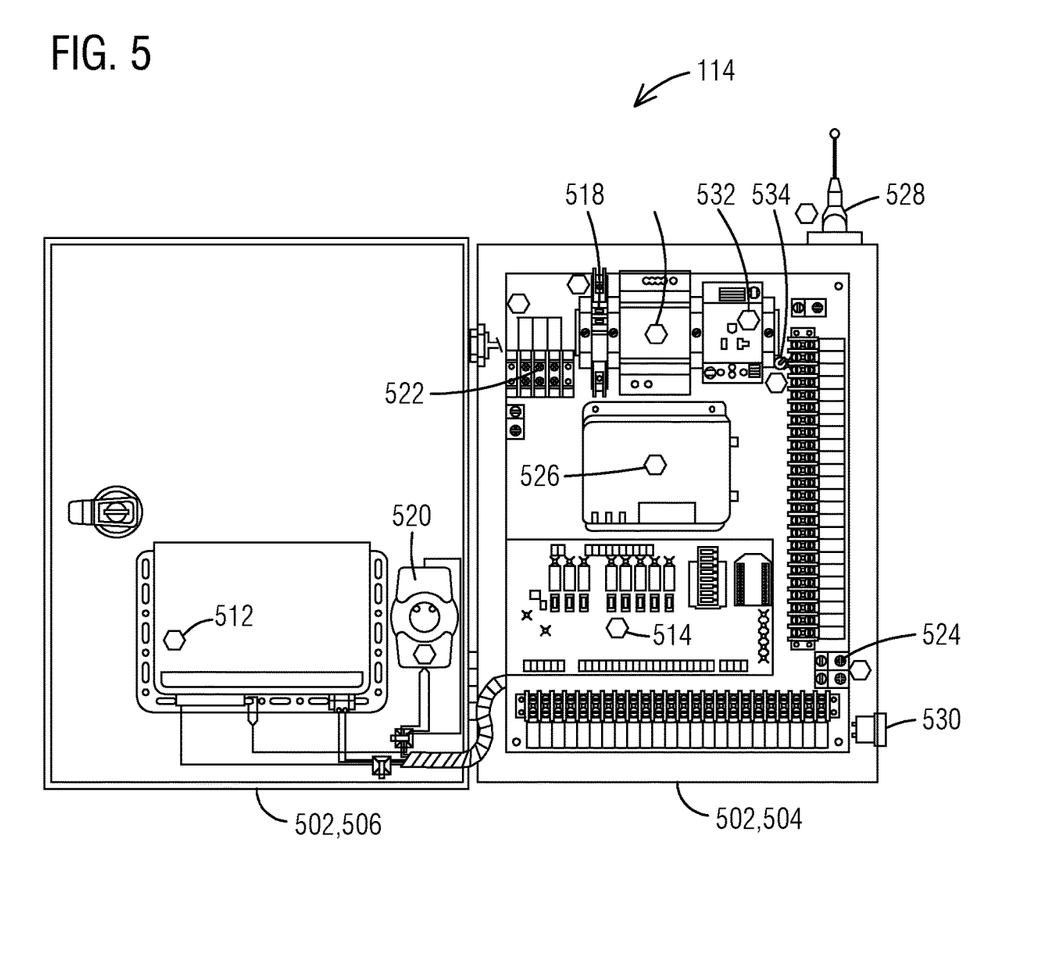
FIG. 5 is a block diagram of an example implementation of the control panel of FIGS. 1 and 2.

FIG. 5 is a block diagram of an example implementation of the control panel controller 500. The control panel 114 is coupled to the sensors and includes field configurable inputs to terminate fluid characteristic signals received from the sensors and a wireless communication component to transmits data based on the fluid characteristic signals to the remote analytics unit 122. The remote analytics unit 122 provides a command to the control panel 114 to change an operation of one or more equipment based on the fault condition. For some embodiments, the remote analytics unit 122 provides a command to change an operation of one or more life safety equipment based on the fault condition. For some embodiments, the remote analytics unit 122 provides a command to change an operation of one or more building management equipment external to the life safety equipment based on the fault condition.

The control panel 114 comprises a housing 502 having a housing base 504 and a housing door 506 connected to the housing base. For some embodiments, the housing 502 includes a housing lock 508 for securing the housing door 506 to the housing base 504 when closed. The housing 502 further includes wiring 510 to connect electrical components of the housing base 504 to electrical components of the housing door 506.

The control panel 114 is furnished with multiple field configurable analog inputs for termination of temperature, pressure, vibration velocity and dry contact signals. For some embodiments, the control panel uses 114 a private cellular network to transmit information to the remote analytics unit 122 and hold up to 48 hours of data while operating in stand-alone mode. The control panel 114 includes a control panel gateway 512, which is a solid-state computer mounted on the housing door 506 of the control panel. The control panel gateway 512 has the capacity to maintain data of one or more sensors for a predetermined period of time, such as up to 48 hours, when operating in a standalone mode. The control panel gateway 512 also include ports for communication with the remote analytics unit 122 via a wireless link and/or for configuration, diagnostics, and integration of the control panel 114.

The control panel 114 also includes an input/output module 514, a power supply 516, a circuit breaker and DC PS disconnect 518, a protection dongle 520, an AC terminal block 522, a low voltage terminal block and ground lugs 524, a wireless modem (eCumulus router, cellular communication) 526 coupled to gateway 512 via an ethernet cable, eCumulus router power kit, an external antenna 528 coupled to the cell modem 526, a test mode push button 530, an AC power outlet 532, and a self-resettable 1A fuse 534.

Figure 6:
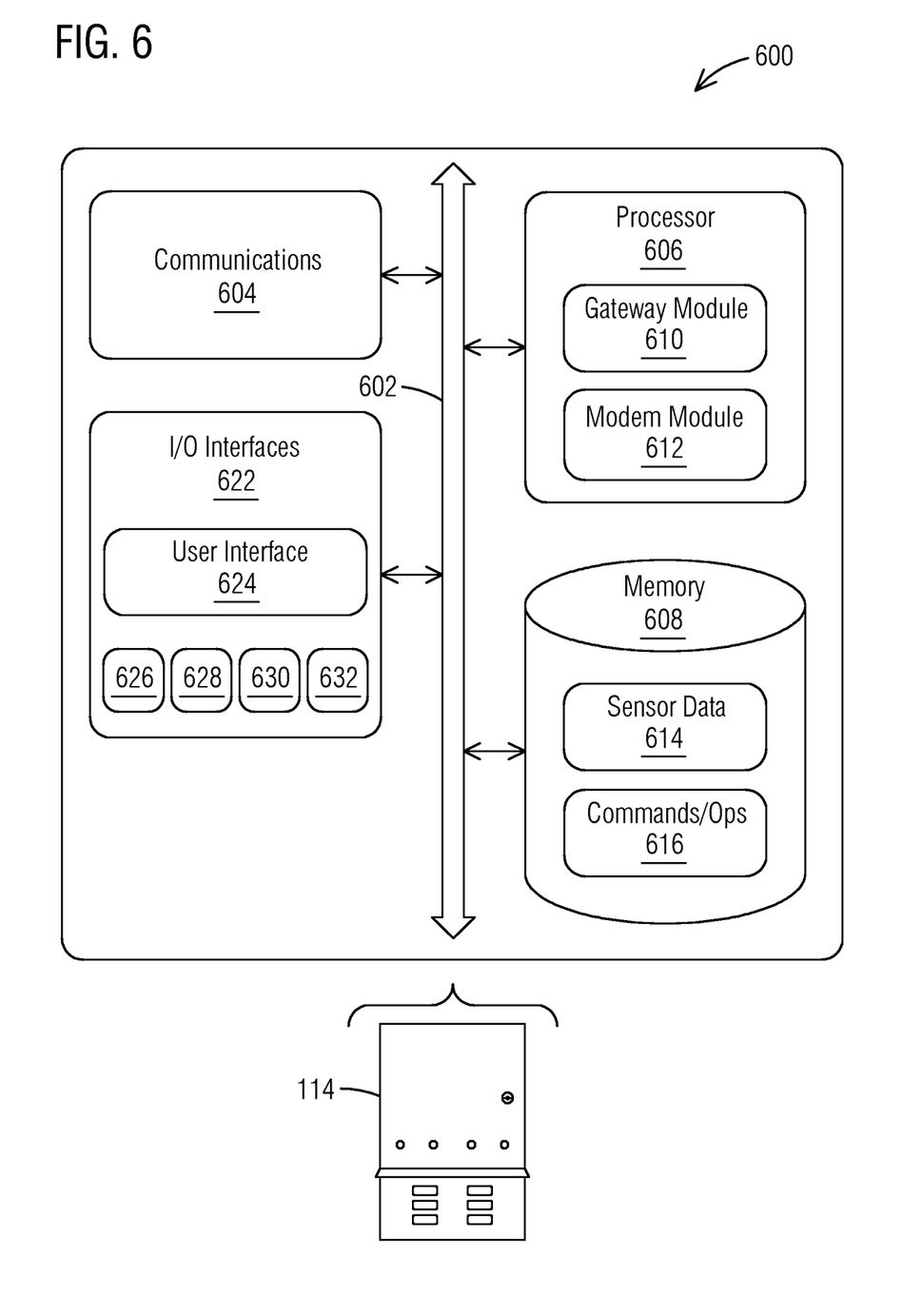
FIG. 6 is a block diagram of another example implementation of the control panel of FIGS. 1 and 2.

FIG. 6 represents example device components 600 of the control panel 114 comprising a communication bus 602 for interconnecting the other device components directly or indirectly, one or more communication components 604 communicating other entities via a wired or wireless network, one or more processors 606, and one or more memory components 608. The one or more processors 606 may execute code and process data received at other components of the device components 600, such as information received at the communication component 604 or stored at the memory component 608. The code associated with the control panel 114 and stored by the memory component 608 may include, but is not limited to, operating systems, applications, modules, drivers, and the like. An operating system includes executable code that controls basic functions of the control panel 114, such as interactions among the various components of the device components 600, communication with external devices via the communication component 604, and storage and retrieval of code and data to and from the memory component 608.

Each application includes executable code to provide specific functionality for the processor 606 and/or remaining components of the control panel 114. An example of an application executable by the processor 606 includes, but is not limited to, a gateway module 610 to manage general operation of the control panel 114, and a modem module 612 to operate communications with external devices, such as the remote analytics unit 122 and the network management station 130.

Data, stored by the memory component 608, is information that may be referenced and/or manipulated by an operating system or application for performing functions of the control panel 114. Examples of data stored by the memory component 608 may include, but are not limited to, sensor data 614 collected by the sensors 208, 210, 212 and received by the control panel 114 and command/operation data 616 to change an operation, of one or more life safety equipment or one or more building management equipment external to the life safety equipment, based on the fault condition.

The device components 600 of the control panel 114 may further comprise Input/Output (I/O) interfaces 622 having one or more input components and/or one or more output components. The I/O interfaces 622 of the device components 600 may include one or more visual, audio, mechanical, and/or other components. A user interface 624 of the device components 600 may include portions of the input and output components of the I/O interfaces 620 and be used to interact with a user of the control panel 114. For example, the user interface 624 may include a combination of hardware and software to provide a user with a desired user experience. The I/O interfaces 622 of the control panel 114 may include field configurable inputs to terminate fluid characteristic signals received from the sensors 208, 210, 212.

It is to be understood that FIG. 6 is provided for illustrative purposes only to represent examples of the device components 600 of the control panel 114 and is not intended to be a complete diagram of the various components that may be utilized by each device. The control panel 114 may include various other components not shown in FIG. 6, may include a combination of two or more components, or a division of a particular component into two or more separate components, and still be within the scope of the present invention.

Figure 7:
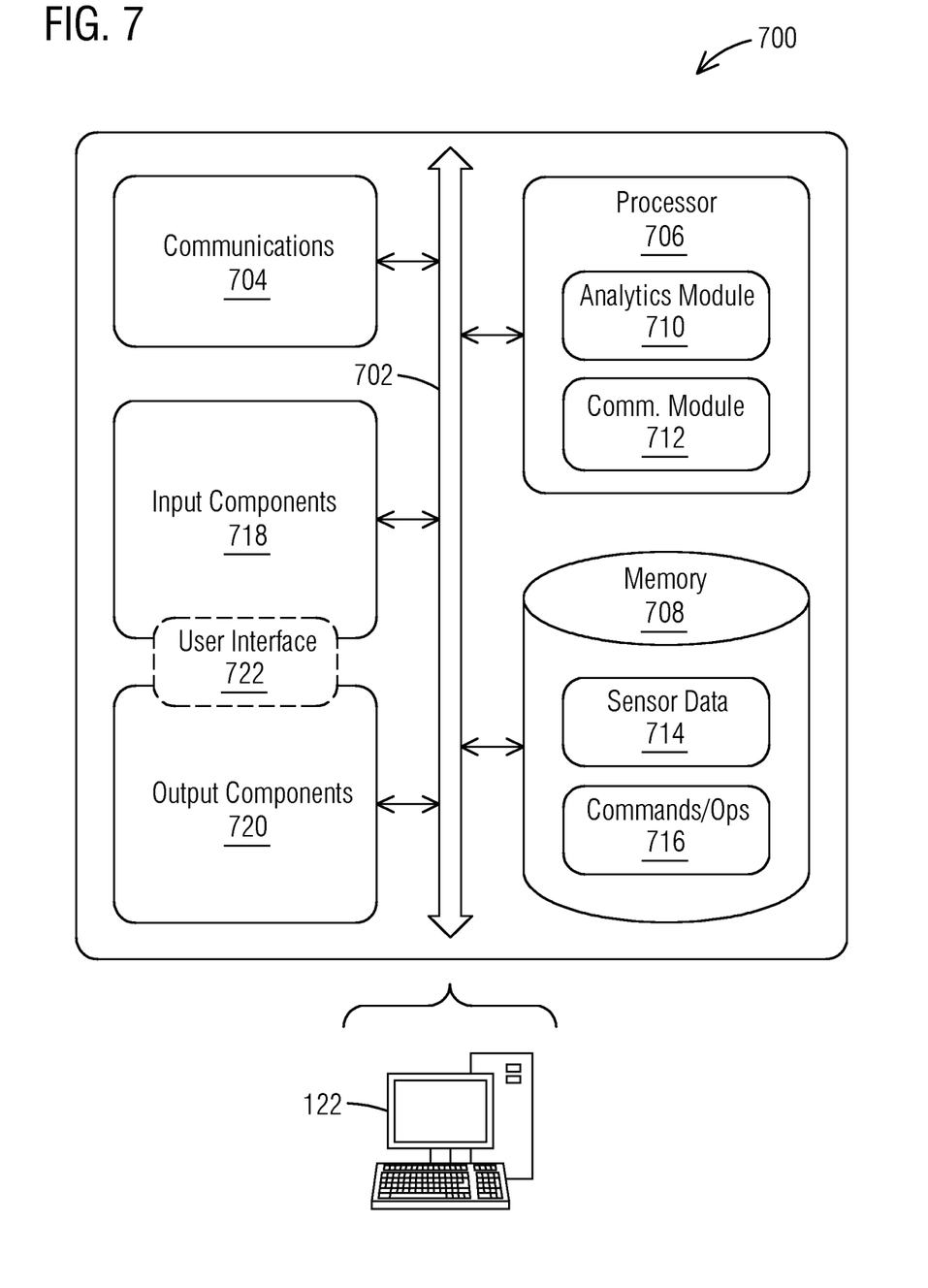
FIG. 7 is a block diagram of an example implementation of the remote analytics unit of FIG. 1.

FIG. 7 represents example device components 700 of the remote analytics unit 122 comprising a communication bus 702 for interconnecting the other device components directly or indirectly, one or more communication components 704 communicating other entities via a wired or wireless network, one or more processors 706, and one or more memory components 708. The one or more processors 706 may execute code and process data received at other components of the device components 700, such as information received at the communication component 704 or stored at the memory component 708. The code associated with the remote analytics unit 122 and stored by the memory component 708 may include, but is not limited to, operating systems, applications, modules, drivers, and the like. An operating system includes executable code that controls basic functions of the remote analytics unit 122, such as interactions among the various components of the device components 700, communication with external devices via the communication component 704, and storage and retrieval of code and data to and from the memory component 708.

Each application includes executable code to provide specific functionality for the processor 706 and/or remaining components of the remote analytics unit 122. An example of an application executable by the processor 706 includes, but is not limited to, an analytics module 710 to manage general operation of the remote analytics unit 122, and a communication module 712 to operate communications with external devices, such as the control panel 114, the network management station 130, and/or the sensors 208, 210, 212.

Data, stored by the memory component 708, is information that may be referenced and/or manipulated by an operating system or application for performing functions of the remote analytics unit 122. Examples of data stored by the memory component 708 may include, but are not limited to, sensor data 714 collected by the sensors 208, 210, 212 and received by the remote analytics unit 122 and command/operation data 716 to change an operation, of one or more life safety equipment or one or more building management equipment external to the life safety equipment, based on the fault condition.

The device components 700 of the remote analytics unit 122 may further comprise one or more input components 718 and/or one or more output components 720. The input components 718 and the output components 720 may include one or more visual, audio, mechanical, and/or other components. A user interface 722 of the device components 700 may include portions of the input and output components 718, 720 and be used to interact with a user of the remote analytics unit 122. For example, the user interface 722 may include a combination of hardware and software to provide a user with a desired user experience.

It is to be understood that FIG. 7 is provided for illustrative purposes only to represent examples of the device components 700 of the remote analytics unit 122 and is not intended to be a complete diagram of the various components that may be utilized by each device. The remote analytics unit 122 may include various other components not shown in FIG. 7, may include a combination of two or more components, or a division of a particular component into two or more separate components, and still be within the scope of the present invention.

Figure 8:
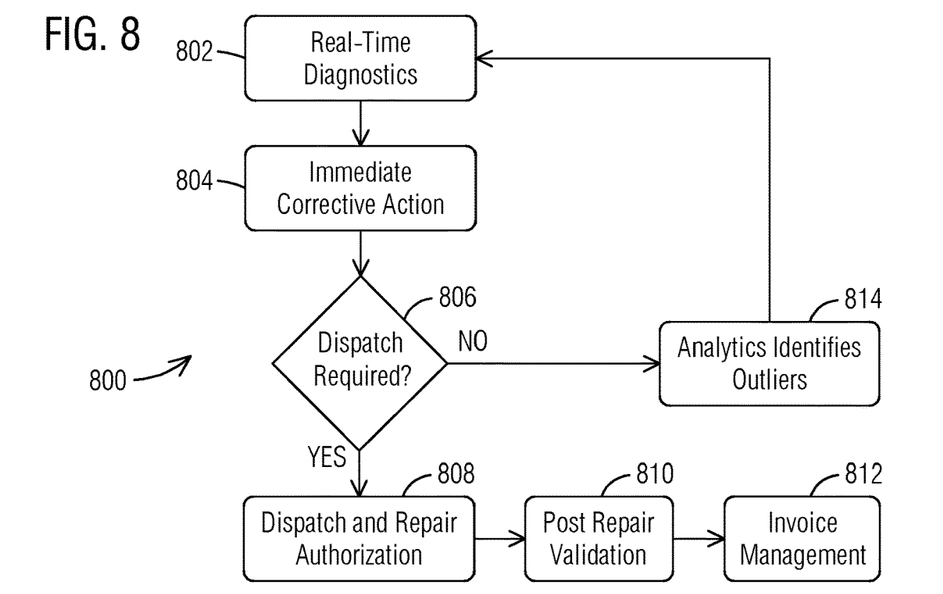
FIG. 8 is a flow diagram of an example analytics operation of the remote analytics unit of FIGS. 1 and 7.

Referring to FIG. 8, there is shown a flow diagram of an example operation of the remote analytics unit 122. Real-time diagnostics data is collected by the remote analytics unit 122, such as data received directly or indirectly from the sensors 208, 210, 212. In response to receiving the data (802), The remote analytics unit 122 performs immediate corrective action (804), such as commanding a life safety equipment or other building management equipment to change operation based on a detected fault condition, if the fault condition is a type that may be corrected in this manner. For fault conditions still outstanding, the remote analytics unit 122 determines whether to notify a technician to the facility to investigate and address the outstanding fault condition (806). In response to determining that dispatch is required (806), the remote analytics unit 122 generates and transmits a dispatch & repair authorization for processing (808) and await an indication of completion (810). An invoice is generated by an invoice management system (812) in response to determining that the task has been completed. If the remote analytics unit 122 determines that a technician to investigate and address the outstanding fault condition is not needed (806), then the remote analytics unit identifiers the outlier or outliers (814) and continues to collect and monitor incoming data (802).

Figure 9:
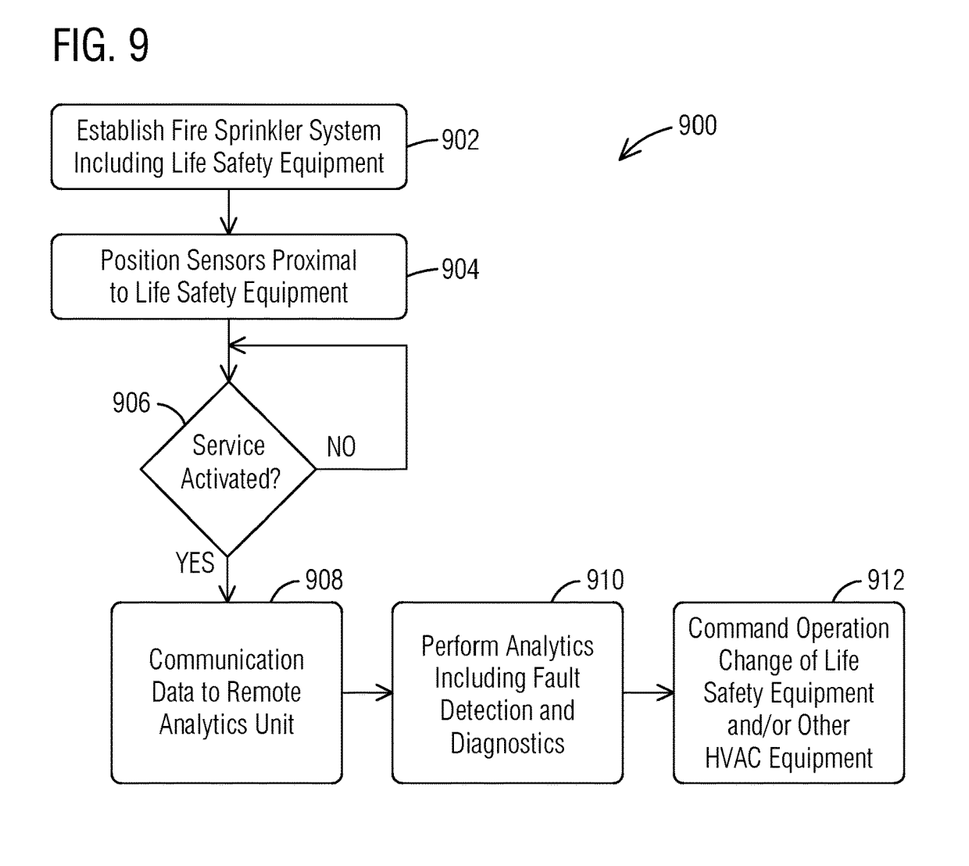
FIG. 9 is a flow diagram of an example system operation of the fire sprinkler system of FIG. 1.

Referring to FIG. 9, there is shown an example system operation 900 of the fire sprinkler system 100. Life safety equipment are established in which the life safety equipment include a fluid pump 202, a fluid pipe section 204, and a fluid coupling section 206 (902). For example, the life safety equipment may be installed and configured at a facility 102. Sensors 208, 210, 212 may be positioned proximal to the life safety equipment in which each sensor detects a fluid characteristic within a particular equipment of the life safety equipment (904). For some embodiments, the sensors 208, 210, 212 may be positioned with or soon after establishment of the life safety equipment. For some embodiments, the sensors 208, 210, 212 may be installed and configure for existing life safety equipment previously installed at the facility 102.

The smart services of the fire sprinkler system 100 may be activated (906) after establishment of the life safety equipment (902) and positioning of the sensors 208, 210, 212 (904). In response to activating the services (906), the sensors 208, 210, 212 may communicate directly or indirectly with a remote analytics unit 122 via a multi-location network 124 in which the remote analytics unit receives data based on the fluid characteristic detected at the sensors (908). In response to receiving the data (908), the remote analytics unit 122 may determining a fault condition associated with at least one life safety equipment based on the fluid characteristic (910).

For some embodiments, the remote analytics unit 122 provides a command to the control panel 114 to change an operation of one or more equipment based on the fault condition (912). For some embodiments, the remote analytics unit 122 provides a command to change an operation of one or more life safety equipment based on the fault condition. For some embodiments, the remote analytics unit 122 provides a command to change an operation of one or more building management equipment external to the life safety equipment based on the fault condition.

Figure 10:
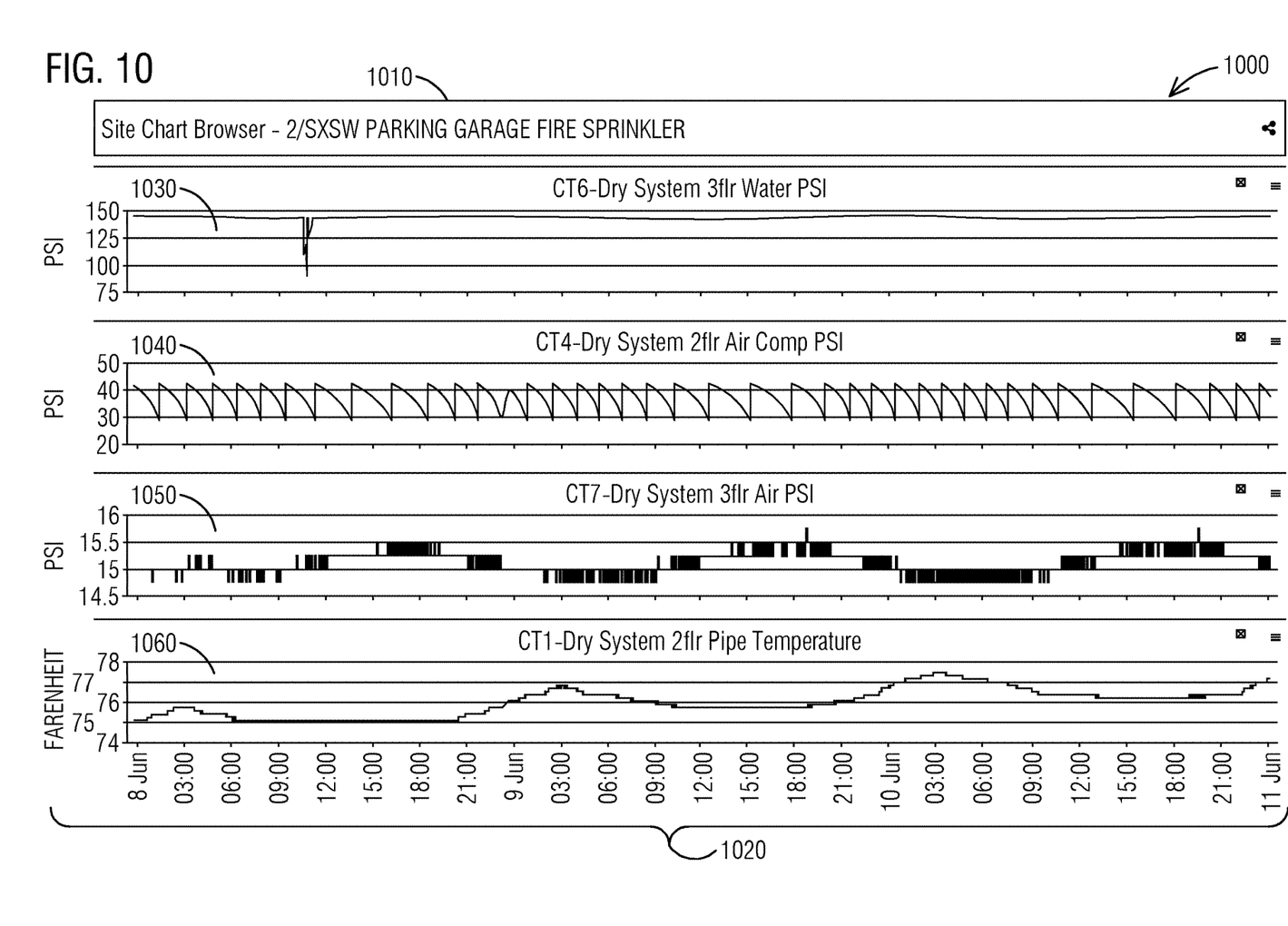
FIG. 10 represents an example implementation of data associated with the sensor-collected information and analyzed by the remote analytics unit of FIGS. 1 and 7.

Referring to FIG. 10, there is shown an example implementation of graphical data 1000 associated with the sensor-collected information and analyzed by the remote analytics unit. The graphical data 1000 may be represented by a header 1010 describing the source or context of the data. For example, the graphical data 1000 may be shown in a browser window and based on a sprinkler system for a parking garage. The graphical data 1000 may be represented based on a certain time period 1020. For example, the data may represent a time period from midnight of June $8^{th}$ through midnight of June $11^{th}$ in three hour increments. The graphical data 1000 may be presented in one or more forms. Examples of the presentation forms include, but are not limited to, fluid pressure (in PSI) for one or more locations 1030, air pressure (in PSI) for one or more locations 1040, 1050, pipe temperature (in degrees Fahrenheit or Celsius) for one or more locations 1060, and the like.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A fire sprinkler system for building management comprising:
   a plurality of life safety equipment including a fluid pump, a fluid pipe section, and a fluid coupling section;
   a plurality of sensors position proximal to the plurality of life safety equipment, each sensor of the plurality of sensors detecting a fluid characteristic within a particular equipment of the life safety equipment;
   a remote analytics unit communicating directly or indirectly with the plurality of sensors via a multi-location network, the remote analytics unit receiving data based on the fluid characteristics detected at the plurality of sensors and determining a fault condition associated with at least one equipment of the plurality of life safety equipment based on the fluid characteristic; and
   a control panel coupled to the plurality of sensors, the control panel including a plurality of field configurable inputs to terminate fluid characteristic signals received from the plurality of sensors and a communication component to transmits data based on the fluid characteristic signals to the remote analytics unit,
   wherein the remote analytics unit provides a command to the control panel to change an operation of one or more equipment of the plurality of life safety equipment based on the fault condition.

2. The fire sprinkler system as described in claim 1, wherein the communication component is a wireless communication component.

3. The fire sprinkler system as described in claim 1, wherein the plurality of sensors include a temperature sensor positioned adjacent to an external surface the fluid pipe section, the temperature sensor detecting a temperature in proximity to the fluid pipe section.

4. The fire sprinkler system as described in claim 3, wherein the temperature sensor supplements an air temperature sensor distal from the external surface of the fluid pipe section.

5. The fire sprinkler system as described in claim 1, wherein the plurality of sensors include a pressure sensor coupled to the fluid coupling section, the pressure sensor detecting a fluid pressure within the fluid coupling section.

6. The fire sprinkler system as described in claim 1, wherein the plurality of sensors include a corrosion sensor positioned adjacent to an external surface of the fluid pipe section, the corrosion sensor detecting an energy differential associated with a corrosion condition within the fluid pipe section.

7. The fire sprinkler system as described in claim 1, wherein the corrosion sensor emits and detects ultrasonic waves to detect a thickness of the fluid pipe section.

8. The fire sprinkler system as described in claim 1, wherein the plurality of sensors include a vibration sensor positioned adjacent the fluid pipe section, the vibration sensor detecting a motion characteristic associated with a fatigue failure condition of the fluid pipe section.

9. The fire sprinkler system as described in claim 1, wherein the remote analytics unit provides a command to change an operation of one or more equipment of the plurality of life safety equipment based on the fault condition.

10. The fire sprinkler system as described in claim 1, wherein the remote analytics unit provides a command to change an operation of one or more building management equipment external to the plurality of life safety equipment based on the fault condition.

11. A method of a fire sprinkler system for building management, the method comprising:
    establishing a plurality of life safety equipment including a fluid pump, a fluid pipe section, and a fluid coupling section;
    positioning a plurality of sensors proximal to the plurality of life safety equipment, each sensor of the plurality of sensors detecting a fluid characteristic within a particular equipment of the life safety equipment;
    communicating, by the plurality of sensors, directly or indirectly with a remote analytics unit via a multi-location network, the remote analytics unit receiving data based on the fluid characteristic detected at the plurality of sensors;
    determining, at the remote analytics unit, a fault condition associated with at least one equipment of the plurality of life safety equipment based on the fluid characteristic; and
    providing a command to a control panel coupled to the plurality of sensors, the control panel including a plurality of field configurable inputs to terminate fluid characteristic signals received from the plurality of sensors and a communication component to transmits data based on the fluid characteristic signals to the remote analytics unit, wherein the command to the control panel to change an operation of one or more equipment of the plurality of life safety equipment based on the fault condition.

12. The method as described in claim 11, wherein the communication component is a wireless communication component.

13. The method as described in claim 11, wherein the plurality of sensors include a temperature sensor positioned adjacent to an external surface the fluid pipe section, the temperature sensor detecting a temperature in proximity to the fluid pipe section.

14. The method as described in claim 13, wherein the temperature sensor supplements an air temperature sensor distal from the external surface of the fluid pipe section.

15. The method as described in claim 11, wherein the plurality of sensors include a pressure sensor coupled to the fluid coupling section, the pressure sensor detecting a fluid pressure within the fluid coupling section.

16. The method as described in claim 11, wherein the plurality of sensors include a corrosion sensor positioned adjacent to an external surface of the fluid pipe section, the corrosion sensor detecting an energy differential associated with a corrosion condition within the fluid pipe section.

17. The method as described in claim 11, wherein the corrosion sensor emits and detects ultrasonic waves to detect a thickness of the fluid pipe section.

18. The method as described in claim 11, wherein the plurality of sensors include a vibration sensor positioned adjacent the fluid pipe section, the vibration sensor detecting a motion characteristic associated with a fatigue failure condition of the fluid pipe section.

19. The method as described in claim 11, wherein the remote analytics unit provides a command to change an operation of one or more equipment of the plurality of life safety equipment based on the fault condition.

20. The method as described in claim 11, wherein the remote analytics unit provides a command to change an operation of one or more building management equipment external to the plurality of life safety equipment based on the fault condition.

21. A system for monitoring an existing fire sprinkler system installed in a building, the fire sprinkler system having including a fluid pump and a fluid pipe network coupled to the fluid pump, the fluid pipe network having a plurality of pipe components, the pipe components including a plurality of pipe sections and at least one fluid coupling section, the system comprising:
- a plurality of temperature sensors, each temperature sensor positioned proximal to a respective one of the pipe components of the fluid pipe network such that each sensor detects a temperature characteristic within the respective pipe component;
- a remote analytics unit communicating directly or indirectly with the plurality of sensors via a multi-location network, the remote analytics unit receiving data based on the temperature characteristics detected at the plurality of sensors and determining a fault condition associated with at least one pipe component of the plurality of existing fire sprinkler system based on the temperature characteristic; and
- a control panel coupled to the plurality of temperature sensors, the control panel including a plurality of field configurable inputs to terminate fluid characteristic signals received from the plurality of temperature sensors and a communication component to transmits data based on the fluid characteristic signals to the remote analytics unit,
wherein the remote analytics unit provides a command to the control panel to change an operation of one or more equipment of the plurality of life safety equipment based on the fault condition.

* * * * *